(12) United States Patent
Senemaud

(10) Patent No.: US 9,178,921 B2
(45) Date of Patent: Nov. 3, 2015

(54) ACCESSORY DEVICE FOR MIXING AUDIO STREAMS FROM TWO PORTABLE AUDIO UNITS, AND BROADCASTING DEVICE COMPRISING SAID ACCESSORY DEVICE

(76) Inventor: Xavier Senemaud, Saint Germain en Laye (FR)

( * ) Notice: Subject to any disclaimer, the term of this patent is extended or adjusted under 35 U.S.C. 154(b) by 386 days.

(21) Appl. No.: 13/635,877

(22) PCT Filed: Mar. 21, 2011

(86) PCT No.: PCT/FR2011/050570
§ 371 (c)(1),
(2), (4) Date: Sep. 18, 2012

(87) PCT Pub. No.: WO2011/117520
PCT Pub. Date: Sep. 29, 2011

(65) Prior Publication Data
US 2013/0016849 A1 Jan. 17, 2013

(30) Foreign Application Priority Data
Mar. 22, 2010 (FR) ...................................... 10 52057

(51) Int. Cl.
*H04H 60/05* (2008.01)
*H04L 29/06* (2006.01)
(52) U.S. Cl.
CPC .................................. *H04L 65/4069* (2013.01)
(58) Field of Classification Search
None
See application file for complete search history.

(56) References Cited

U.S. PATENT DOCUMENTS

| | | | |
|---|---|---|---|
| 2006/0221776 A1* | 10/2006 | Roman et al. | 369/1 |
| 2007/0022156 A1 | 1/2007 | Grubbs | |
| 2007/0161402 A1 | 7/2007 | Ng et al. | |
| 2008/0162668 A1 | 7/2008 | Miller | |
| 2009/0282451 A1 | 11/2009 | Jensen | |
| 2010/0227643 A1* | 9/2010 | Yew et al. | 455/557 |

OTHER PUBLICATIONS

International Search Report completed May 23, 2011 and mailed Jun. 6, 2011 from corresponding International Application No. PCT/FR2011/050570 filed Mar. 21, 2011 (4 pages).
Written Opinion completed May 23, 2011 and mailed Jun. 6, 2011 from corresponding International Application No. PCT/FR2011/050570 filed Mar. 21, 2011 (6 pages).

* cited by examiner

*Primary Examiner* — Regina N Holder
(74) *Attorney, Agent, or Firm* — Klein, O'Neill & Singh, LLP

(57) ABSTRACT

An accessory device for a first portable audio unit, for sharing audio data between the first audio unit and a second portable audio unit, the accessory device including communication means linked to the audio input and arranged in such a way as to send the inherent audio stream originating from the portable audio unit to an accessory device linked to the second portable audio unit and to receive a third-party audio stream from said accessory device of the second portable audio unit, and mixing means arranged in such a way as to receive as input the inherent audio stream and the third-party audio stream, and to send as output, to the audio output, a mixed audio stream corresponding to a combination of the inherent audio stream and of the third-party audio stream.

20 Claims, 2 Drawing Sheets

ACCESSORY DEVICE FOR MIXING AUDIO STREAMS FROM TWO PORTABLE AUDIO UNITS, AND BROADCASTING DEVICE COMPRISING SAID ACCESSORY DEVICE

CROSS-REFERENCE TO RELATED APPLICATION

This is a national phase application under 35 U.S.C. §371 of PCT Application No. PCT/FR2011/050570, filed Mar. 21, 2011, which claims the benefit of French application No. 1052057, filed Mar. 22, 2010, the contents of each of which are expressly incorporated herein by reference.

FIELD OF ART

The system, apparatus, and method disclosed herein relate to portable multimedia units allowing a user to listen to an audio stream via, for example, a headset. The system, apparatus, and method aim at allowing a simple and quick sharing of the audio stream of a unit with a plurality of third-party units.

BACKGROUND

A social network, such as the one known under the name Facebook (registered trademark), allows the members of the network to exchange information and share multimedia contents (songs, videos, etc.). These exchanges and sharings are traditionally performed via Internet and require a device capable of connecting to Internet (computer, mobile phone, etc.). Such a social network is not satisfactory since the exchanges are not performed in real time, the members being not continuously connected.

A portable multimedia unit, such as a unit marketed under the trademark IPOD, includes a memory for the storage of multimedia data, in which, for example, songs or audio books are stored, and means for reading these data arranged to generate an audio stream. In a classic way, the unit comprises an audio connector to which means are connected for broadcasting the audio stream; typically, in a portable unit, the connector can appear in the form of a "jack" which receives, for example, a male plug of a headset which broadcasts the audio stream in the user's ears. The portable multimedia unit is traditionally used in an individual way, the audio stream from the unit being listened to only by the user of the unit who wears the headset.

To share an audio stream as a social network does, several alternatives are offered to the user.

An immediate solution consists in connecting speakers on the audio connector of the unit so that the audio stream is amplified and heard by the persons near the user of the unit. Unfortunately, this solution is not satisfactory in all the environments. For example, in public transportation, such as the subway, this use is banned because the environment is generally very noisy and besides, it would be an embarrassment for the other users of the subway. Because of its lack of selectivity, the sharing of audio stream via speakers is not appropriate.

Another solution consists in using a T-shaped mechanical audio accessory and comprising an audio input, intended to be connected to the portable multimedia unit, and two audio outputs, each one appearing in the form of an audio connector capable of receiving, for example, the male plug of a jack of a headset. Thanks to such an accessory, which forms in fact a dual connector, two users can listen to the same audio stream, each connecting his/her own headset to an output of the T-shaped accessory. However, this solution is not totally satisfactory, the possibilities of interaction on the listened to audio stream are limited and there is no musical dialogue.

SUMMARY

The applicant tried to transform a portable multimedia unit intended for a personal use in a multimedia unit capable of sharing and exchanging in a friendly way an audio stream in a noisy environment.

For that purpose, the system, apparatus, and method relate to an accessory device for a first portable audio unit, for sharing audio data between the first audio unit and a second portable audio unit, the accessory device comprising an audio input intended to receive an inherent audio stream from the first portable audio unit; an audio output intended to be connected to audio broadcasting means; communication means connected to the audio input and arranged in such a way as to send the inherent audio stream originating from the portable audio unit to an accessory device connected to the second portable audio unit and to receive a third-party audio stream from said accessory device of the second portable audio unit; and mixing means arranged in such a way as to receive as input the inherent audio stream and the third-party audio stream, and to send as output, to the audio output, a mixed audio stream corresponding to a combination of the inherent audio stream and of the third-party audio stream.

Thanks to the system, apparatus, and method, it is sufficient to connect the accessory device to a portable unit to allow it to share its audio stream with another unit having the same accessory, and to receive the stream of the latter and to combine it with its own. So, one can share his/her audio stream but also share the listening to the audio stream of another unit.

Naturally, a combination of the two audio streams to obtain the mixed stream stands for either of the sole inherent audio stream, or of the sole third-party audio stream, or of a linear or non-linear combination with equal or non-equal proportions of these streams, with any audio modification of these audio streams.

Preferably, the mixing means are arranged to send the mixed audio stream to the communication means. So, sharing stands for a joint audio listening or a joint audio broadcast of the same audio stream with the ability to mix the audio streams upon sending or reception.

According to a preferred alternative of the system, apparatus, and method, the communication means are wireless communication means, preferably, of the Hertzian, Bluetooth (registered trademark), Wifi (registered trademark) or infrared type.

Preferably, the accessory device includes visual identification means allowing a user of such an accessory to recognize another user and thus to propose exchanging their audio streams. Such identification means can consist for example of visual signs as colours and/or forms on a protective case or a casing of the accessory device.

According to an aspect of the system, apparatus, and method, the mixing means comprise: two attenuators receiving respectively as input the inherent and third-party audio streams, both of them being arranged to attenuate the sound volume of the corresponding audio stream to allow regulation of their respective sound volume; and an adder arranged to add the attenuated audio streams at the output of the attenuators to form the mixed audio stream.

So, the sound volume of the mixed audio stream is advantageously regulated by independently regulating the sound volumes of the inherent and third-party audio streams, which allows to adjust their relative sound levels.

Preferably, every attenuator is setup by an attenuation rate defining the attenuation of the sound volume of the audio stream received as input of said attenuator, the mixing means comprising a distribution actuator arranged to control the value of the attenuation rates of the attenuators.

So, the user can advantageously adjust the distribution of the inherent and third-party audio streams by simple use of the distribution actuator to obtain an audio stream mixed the way he/she likes.

Also preferably, the attenuation rate of a first attenuator being determined, the attenuation rate of the second attenuator is automatically calculated in such a way that the sound volume of the mixed audio stream presents, as output of the mixing means, a predetermined value which is independent from the attenuation rate of the first attenuator.

So, when the user adjusts the distribution of the inherent and third-party audio streams with the distribution actuator, the sound volume of the mixed audio stream remains at a predetermined value, which is pleasant for the user. This predetermined value can be previously adjusted for example by the user by adjusting the general volume of the mixed audio stream. The sound volume of the mixed audio stream is then totally independent from the sound volume of the inherent and third-party streams.

According to another aspect of the system, apparatus, and method, the communication means are wireless ones and comprise a radio transceiver, for example of radio waves in the FM band, arranged to send and receive without preliminary identification between a transmitter and a receiver. Such means advantageously allow to avoid a preliminary phase of identification between the accessory devices, the sharing being performed in real time. It is obvious that a communication via Bluetooth or infrared could also be appropriate.

It can be advantageously foreseen that the sending and the reception are performed without preliminary identification only between accessory devices of the same type. So, in a given environment, only these accessory devices can exchange audio streams between them, these exchanges being made, within the community of accessory devices, without preliminary identification.

Preferably, the device further includes means for locating the second unit sending the third-party audio stream. So, the user of the first portable unit can know the location of the second unit without the second user necessarily communicating it to the first one.

Also preferably, the location means comprise a directional antenna the lobe of reception of which is arranged to move around the location of the unit. Such a directional antenna, having a simple design, further allows to receive the third-party audio stream.

Always preferably, the device comprises recognition means, connected to said location means, arranged to notify the user the relative location of the third-party with regard to the location of the device.

Having "musically" met a third-party user by sharing with him/her audio streams through their accessory devices, the user can locate the third-party user and so physically meet him/her. The providing of visual recognition means on the third-party user's accessory device allows to facilitate his/her identification by the user.

According to a preferred alternative of the system, apparatus, and method, the accessory device comprises a downlink audio canal with a downlink audio input capable of receiving an audio stream from a microphone and a downlink audio output capable of connecting to an audio input of the portable unit.

Preferably, the accessory device comprises a microphone connected to the downlink audio input. With an integrated microphone, the device substitutes itself for the classic interface of the portable unit.

Also preferably, the mixing means are arranged to mix the audio stream from a microphone with the inherent audio stream and/or the third-party audio stream. So, when speaking or singing in the microphone, the user can interact in real time on the mixed audio stream which can be listened to or sent.

The system, apparatus, and method also relate to a device for audio broadcasting comprising an accessory device such as previously presented. A device for audio broadcasting, like a headset or earphones, is advantageously compact. A headset or headphones having earphones with an integrated device allow to connect the device for audio broadcasting to a portable audio unit in a classic way on the audio unit, which is practical and aesthetic.

According to an aspect of the system, apparatus, and method, the recognition means are arranged on a visible part of the audio broadcasting device in a usage position. So, the users of the device can identify each other in a simple and practical way.

BRIEF DESCRIPTION OF THE DRAWINGS

The system, apparatus, and method will be better understood by means of the appended drawings in which.

DETAILED DESCRIPTION

According to the system, apparatus, and method of the present disclosure, a user having a first portable audio unit and an accessory device according to aspects of the invention can exchange some music with a third-party user having the second portable audio unit and an accessory device according to the system, apparatus, and method.

Hereafter, the unit and the device of the user are mentioned as "inherent unit" and "inherent device" whereas those of the third-party are mentioned as "third-party unit" and "third-party device".

Figure 1:
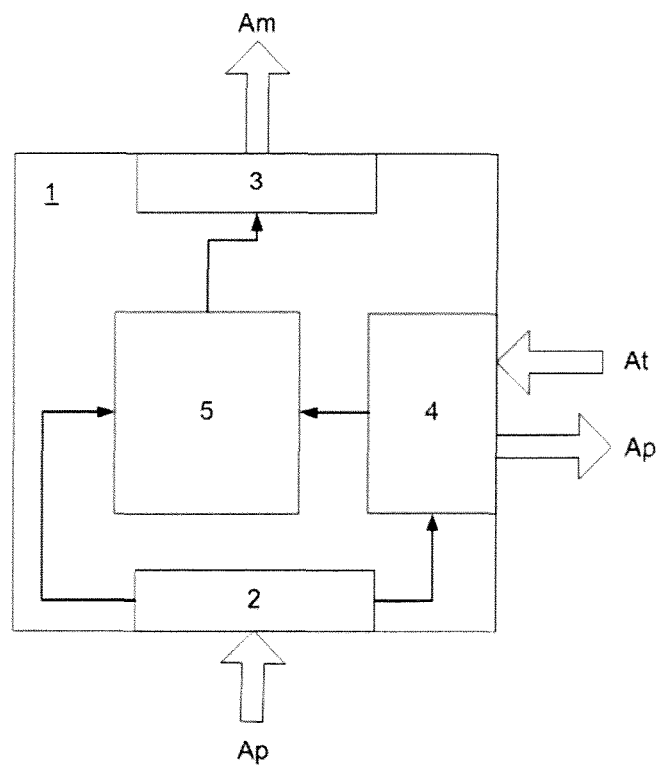
FIG. 1 is a functional diagram of the device of the preferred embodiment in accordance to the invention.

FIG. 1 is a schematic view of an accessory device according to the system, apparatus, and method for a portable audio unit in which the supply unit and the user interface were not represented. The accessory device 1 comprises an audio input 2 intended to receive an inherent audio stream Ap originating from the portable audio unit (not represented) and an audio output 3 intended to receive broadcasting means. The device 1 further comprises communication means 4, which here are wireless communication means, connected to the audio input 2, arranged to transmit the inherent audio stream Ap originating from the inherent portable audio unit to a third-party accessory device connected to a third-party portable audio unit and to receive a third-party audio stream At from said third-party device. The accessory device 1 also contains mixing means 5 arranged to receive as input the inherent Ap and third-party At audio streams and to send as output, to the audio output 3, an audio mixed stream Am corresponding to a combination of the inherent audio stream Ap and of the third-party audio stream At.

In this example, the accessory device 1 according to the system, apparatus, and method is connected to an inherent unit, such as an IPOD (registered trademark) or the like as presented in the preamble of the application. A car radio or a laptop would also be appropriate.

Audio Input and Output

The audio input 2 of the accessory device 1, intended to receive an inherent audio stream Ap originating from the inherent unit, appears in this example in the form of a stereo male audio connector of jack type the diameter of which is classically 3.5 mm. Such an audio connector advantageously allows to connect directly to the audio output of the portable audio device instead of a headset or earphones. Besides, it allows to connect directly the accessory device 1 to the inherent audio unit, that is, without intermediary. The accessory device 1 is thus compact.

Naturally, the audio input 2 of the accessory device 1 can be also arranged at the end of an electric cord (for example, also in the form of a jack connector) if it is required that the accessory device 1 can be remotely handled from the portable audio unit. This is particularly advantageous in case the accessory device 1 is provided with visual identification means (cf. infra) because it allows a user to keep the portable unit in a pocket but to let the accessory device visible, so that it can be visually discovered by the other users.

It is obvious that the audio connector could also appear in the form of a female audio connector. It is particularly advantageous when the audio output of the inherent portable audio unit is a male connector.

The audio output 3 of the device 1, intended to receive audio broadcasting means, appears in this example in the form of a stereo female audio connector intended to receive a male connector of jack type the diameter of which is classically 3.5 mm. As a matter of fact, it is common that the audio broadcasting means, such as earphones, audio headset or portable speakers, possess a male audio connector of jack type to connect to an audio source. The device 1 according to the system, apparatus, and method thus allows to link directly to classic broadcasting means, without intermediary.

So, the accessory device can be easily integrated between the inherent device and the earphones of the user since the input and output connectors of the accessory device provide the interface between the inherent device and the earphones. Thus, the user of an existing unit provided with earphones needs nothing else than the accessory device for its implementation.

Audio connectors of "jack" type were previously presented but it is obvious that any other audio connector could also be appropriate as for example an optical connector or a connector of USB type.

Communication Means

Hereafter, the communication means appear in the form of wireless communication means but it is obvious that an input-output wired communication port, for example of USB type, could also be appropriate.

The wireless communication means 4 are arranged to link the inherent accessory device 1 of the user with another third-party device connected to a third-party portable unit.

The wireless communication means 4 are connected to the audio input 2 and are arranged to transmit the inherent audio stream Ap originating from the inherent portable audio device to the third-party accessory device connected to the third-party portable audio device and to receive a third-party audio stream At from said third-party accessory device. In other words, the communication means 4 fulfil a dialogue function between the inherent and third-party accessory devices.

Preferably, the dialogue is performed according to a radio communication protocol, rather radio waves in the FM band; their range can be for example a few dozens of meters.

Figure 3:
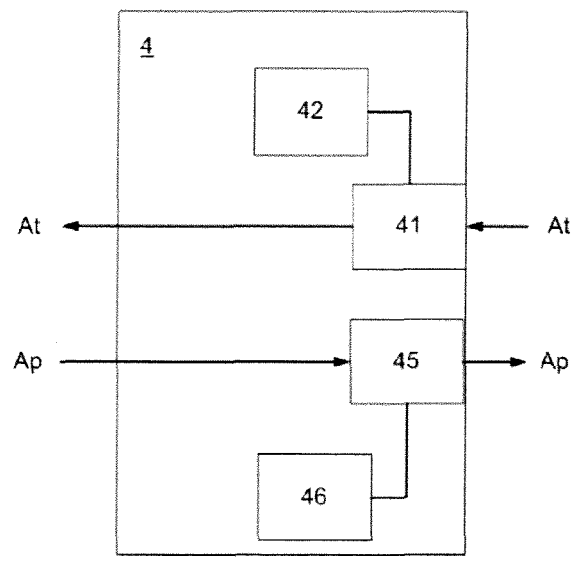
FIG. 3 is a functional diagram of the mixing means of the device of FIG. 1.

For that purpose, referring to FIG. 3, the communication means 4 include a radio transmitter 45 transmitting on the frequency range 50 Hz to 150 Hz and a radio receiver 41 arranged to pick up radio-transmission in said frequency range.

Such a radio stream transmission advantageously allows the persons being situated close to the user (and not necessarily in the immediate proximity of the user) to listen to the inherent audio stream Ap transmitted without preliminary stage of identification and matching. As a matter of fact, everybody being close to the user can pick up the inherent audio stream Ap transmitted without previously contacting the latter, the audio receiver receiving all the audio streams transmitted in said frequency range. This communication of audio data allows the user to share his/her musical tastes and so to help meeting third-parties sharing the same tastes.

The receiver 41 is arranged to operate according to a first mode, a search mode, in which the frequency range is scanned for searching a signal transmitted on said range, and according to a second mode, listening mode, in which the signal, transmitted at a given frequency, is received by the receiver 41.

In the search mode, the receiver 41 measures the quality of the received signals at every scanned frequency. When the quality of the received signal is higher than a definite threshold, the receiver 41 stops his search at the given frequency and switches to listening mode, the audio data transmitted at said given frequency being then received by the receiver. In practice, the search mode is first initiated so as to look for a third-party audio stream At. If need be, the receiver 41 switches to listening mode to allow the user to listen to the third-party audio stream At.

According to a preferred feature of the system, apparatus, and method, the receiver 41 further comprises a search actuator 42 controlling the activation of the operating modes of the receiver 41. In this example, the search actuator 42 appears in the form of a push-button.

When the push-button is activated, the search mode of the receiver 41 is activated to look for a third-party audio stream At in the frequency range, the listening mode being activated during a listening period of a determined duration in case of detection of a third-party audio stream At at a given listening frequency.

If the push-button is actuated during the listening period, the receiver 41 keeps the reception of the third-party audio stream At after the listening period the duration of which is determined, the switching from the listening mode to the search mode being inhibited.

Otherwise, if the push-button is not actuated during the listening period when the receiver 41 is in the listening mode, the search mode remains activated, the receiver 41 keeping on to scan the frequency range determined from the listening frequency.

In other words, the search actuator 42 allows the user to look for an audio stream corresponding to his/her taste. Each time an audio stream is discovered, the user can listen to it for a determined duration, approximately a few seconds, preferably from 5 to 15 seconds. The user successively listens to a plurality of audio streams transmitted by various sources.

When the user discovers an audio stream corresponding to his/her taste, he/she just has to actuate the search actuator 42 to continue the listening.

Naturally, others systems allowing to look for and to listen to streams can be envisaged. The one which was described has the advantage of the simplicity for the device allowing to operate it, because a one and only push-button is used.

A radio communication protocol was described here, but it is obvious that others communication protocols, such as Wifi (registered trademark), Bluetooth (registered trademark) or infrared, could also be appropriate.

According to a variant of the system, apparatus, and method, the transmitter 45 is arranged to insert a predetermined indicator in the transmitted inherent audio stream Ap and the receiver 41 is arranged to discover only the audio streams comprising such an indicator.

So, only the audio streams originating from accessory devices of the same type are discovered, the others audio streams, such as the audio streams with national broadcasting, being ignored. It advantageously allows to limit the usage of the device to a community of users having the same device.

The indicator can be inserted in various ways into the transmitted audio stream. As an example, it can result from a periodic insertion of an identification signal in the transmitted audio stream (sequence of definite bits) or from a predetermined modulation of said audio stream.

Figure 2:
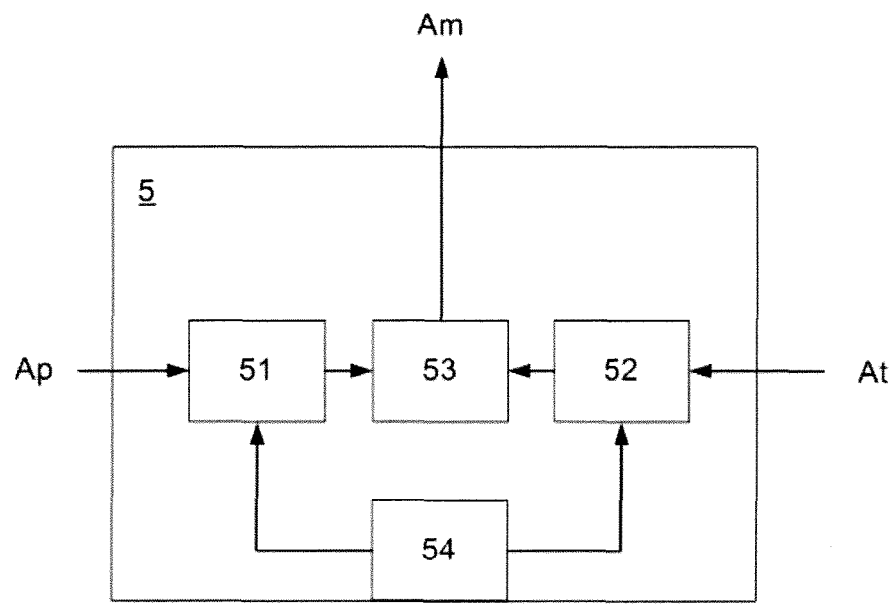
FIG. 2 is a functional diagram of the communication means of the device of FIG. 1.

According to a variant of the system, apparatus, and method, the transmitter 45 is activated/deactivated by a sharing switch 46 represented in FIG. 2. It advantageously allows to stop the transmission when the user does not wish to share his/her inherent audio stream Ap.

Mixing Means

The accessory device 1 also includes mixing means 5 arranged to receive as input the inherent Ap and third-party At audio streams and to transmit as output, to the audio output 3, a mixed audio stream Am corresponding to a combination of the inherent audio stream Ap and the third-party audio stream At as shown in FIG. 2.

Thanks to the mixing means 5, the user can choose the audio stream he wishes to listen to either the inherent audio stream Ap or the third-party audio stream At.

The mixing means 5 comprise first and second attenuators 51, 52, respectively receiving as input the inherent Ap and third-party At audio streams, both of them being arranged to attenuate the sound volume of the corresponding audio stream to allow regulation of their respective sound volume. The mixing means 5 also comprise an adder 53 arranged to add the attenuated audio streams as output of the attenuators 51, 52, the audio stream as output of the adder 53 being designated as mixed audio stream Am.

Every attenuator 51, 52 is setup by an attenuation rate a defining the attenuation of the sound volume for the audio stream as input of said attenuator 51, 52.

In other words, the attenuators 51, 52 respectively receive as input the inherent Ap and third-party At audio streams and respectively attenuate the sound volume of the audio streams Ap, At according to the attenuation rates $\alpha p$, $\alpha t$. These rates are expressed in percentage. As an example, for an attenuation rate of 100%, the volume of the audio stream at the output of the attenuator is zero, for an attenuation rate of 0%, the volume of the audio stream at the output is equal to the volume of the audio stream as input of the attenuator.

The attenuation rate is defined by the following formula:

$$\text{Attenuation rate} = 1 - \frac{\text{volume of the audio stream as output of the attenuator}}{\text{volume of the audio stream as input of the attenuator}}$$

According to a preferred feature of the system, apparatus, and method, every attenuator 51, 52 comprises a volume equalizer (not represented) arranged to impose for each audio stream (third-party or inherent) the same sound volume as input of the attenuators. So, when each of the attenuators 51, 52 has an equal attenuation rate ($\alpha p = \alpha t$), the sound volumes of the audio streams as output of the attenuators are equal. In this preferred embodiment of the invention, the mixing means 5 comprise a distribution actuator 54 arranged to simultaneously control the attenuation rates $\alpha p$, $\alpha t$ of the attenuators 51, 52. The distribution actuator 54 appears in the form of a rotary button, such as a potentiometer, which is rotated to modify the value of the attenuation rate $\alpha t$ of the second attenuator 52 for the third-party audio stream At from 0% to 100%, the value of the attenuation rate $\alpha p$ for the inherent audio stream Ap of the first attenuator 51 being automatically calculated so that the sound volume of the mixed audio stream presents, as output of the mixing means 5, a predetermined value independent from the attenuation rate of the first attenuator. Preferably, the sound volume of the mixed audio stream is constant as output of the mixing means 5.

So, with a unique distribution actuator 54, the user can simultaneously modify the volume attenuation of both audio streams At, Ap; he/she modifies in fact their relative importance in the mixed signal Am. It advantageously allows that the volume of the mixed audio stream Am is constant over time although the percentage of the sound volume of each of the inherent and third-party audio streams At, Ap evolves. The volume of the mixed stream Am can be adjusted for example by the user by means of an adjustment button for the general volume.

In other words, as an example, the mixing means 5 receive an inherent audio stream Ap equal to 20 dB and a third-party audio stream At equal to 30 dB. Both attenuators 51, 52 have an equalizer imposing a sound volume equal to 20 dB before attenuation. The sound volume of the third-party audio stream At is then equalized to 20 dB by the equalizer of the second attenuator 52.

Similarly, the equalizer of the first attenuator 51 receiving as input the inherent audio stream Ap imposes a sound volume equal to 20 dB before attenuation, the sound volume of the inherent audio stream Ap of 20 dB remains unchanged.

According to the position of the distribution actuator 54, the attenuation rates $\alpha p$, $\alpha t$ are modified.

According to a first example, the user controls a maximum attenuation of the third-party audio stream At via the distribution actuator 54. The value of the attenuation rate $\alpha t$ for the third-party audio stream At is 100%, the one for the inherent audio stream Ap being then 0%. The adder 53 adds the inherent audio stream Ap, the volume of which is unchanged, with the third-party audio stream At made silent. The audio mixed stream Am corresponds then to the inherent audio stream Ap the volume of which is equal to 20 dB. So, the user listens only to the inherent audio stream of his/her device, this use corresponding to a personal use of his/her portable audio unit, but with a possible sharing of this inherent audio stream with a third-party unit.

According to a second example, the user controls a minimum attenuation of the third-party audio stream At via the distribution actuator 54. The value of the attenuation rate $\alpha t$ for the third-party audio stream At is 0%, the one for the inherent audio stream Ap being then 100%. The adder 53 adds the inherent audio stream Ap, the volume of which was made silent, to the third-party audio stream At the volume of which is unchanged. The audio mixed stream Am corresponds then to the third-party audio stream At the volume of which is equal to 20 dB. So, the user listens only to the third-party audio stream At transmitted by third-parties and discovers new musical fragments or new tendencies.

According to a third example, the user controls an attenuation of the third-party audio stream At via the distribution actuator 54. The value of the attenuation rate at for the third-party audio stream At is equal to 20%, the one for the inherent audio stream Ap being calculated so that the sound volume of the mixed audio stream is constant as output of the mixing means 5. Decibels following a logarithmic law known by the skilled person, the value of the attenuation rate up for the inherent audio stream Ap is 11%. The adder 53 adds the inherent audio stream Ap having a volume equal to 17.8 dB ((1−0.11)×20 dB) with the third-party audio stream At having a volume equal to 16 dB ((1−0.2)×20 dB). The audio mixed stream Am corresponds then to the inherent Ap and third-party At audio streams the global volume of which is 20 dB.

So, the user, like a "Disc Jockey", can mix audio streams, and does this in a dynamic way while receiving a third-party audio stream At the contents of which he does not handle. This allows the user of the device to create and listen to an original audio stream, the user being advantageously able to set up the distribution of each of the third-party At and inherent Ap audio streams in the audio mixed stream Am so as to create the adequate musical atmosphere, the global sound volume remaining unchanged, which provides a quality of reception.

It is obvious that the device can also comprise a volume actuator, mounted between the adder 53 and the audio output 3, arranged to modify the global sound volume of the mixed audio stream Am, as already mentioned above.

In this example, mixing means 5 which transmit a mixed audio stream Am to the audio output 3 of the unit were described. According to a variant of the system, apparatus, and method, the mixing means 5 are arranged to transmit the mixed audio stream Am to the communication means 4, the unit as shown in FIG. 4, so that the third-party can listen to the mixing performed by the user of the unit.

In this example, an accessory device was described which is passive, which is particularly advantageous for the user since it does not require inherent supply. Nevertheless, the system, apparatus, and method also concern a device with a supply to amplify the volume of the audio streams signals.

Location and Recognition Means

Figure 4:
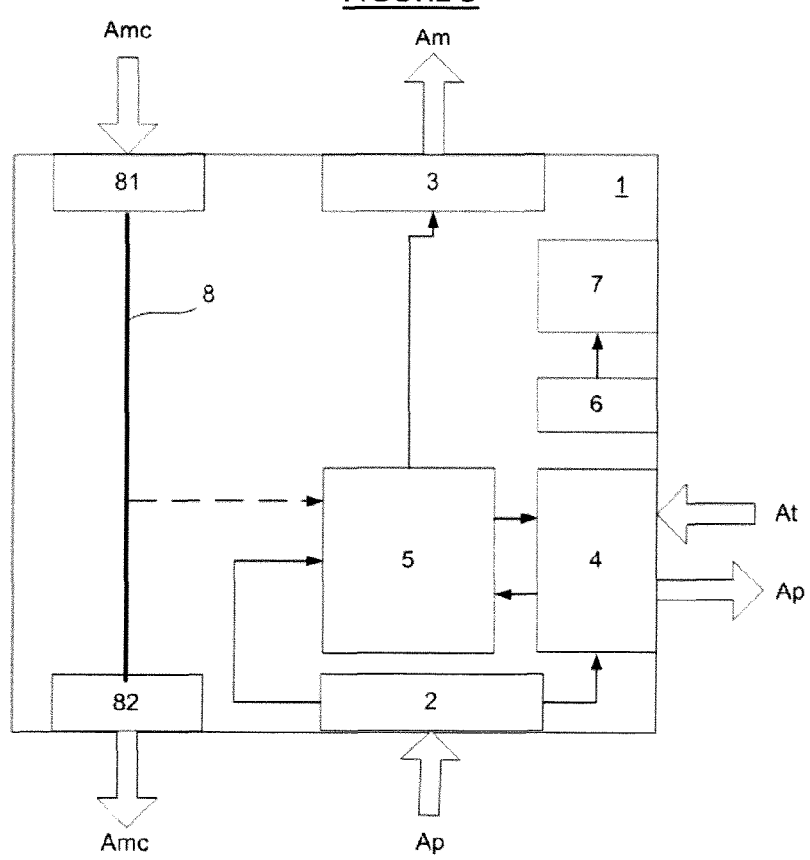
FIG. 4 is a functional diagram of an alternative embodiment of the device according to the system, apparatus, and method of the invention.

According to a preferred variant of the system, apparatus, and method, referring to FIG. 4, the device 1 also includes means 6 for locating the third-party and recognition means 7 arranged to allow the user to determine the location of the third-party with regard to his/her own location.

The means 6 for locating the third-party are, in this example, in the form of a directional antenna 6, the lobe of reception of which is relatively narrow, between 30° and 100°, arranged to detect the transmitting place of the third-party audio stream At. The lobe of reception of the directional antenna 6 is rotatably driven around the position of the user to detect the third-party audio stream At received by the communication means 4 in listening mode.

Once the reception lobe is oriented in the direction of the transmitting place of the third-party audio stream At, the rotation of the reception lobe stops. The angular position of the reception lobe, defined with regard to a predetermined reference position, is provided to the recognition means 7 of the device 1. The angular position of the reception lobe of the directional antenna 6 corresponds then to the position of the third-party which transmits the third-party audio stream At.

The recognition means 7 are, in this example, in the form of a set of location light-emitting diodes, such as electroluminescent diodes (LEDs), arranged so as to define a plurality of directions with regard to the user device. According to preferred embodiment of the system, apparatus, and method, four diodes are provided in rhombus to respectively define the front, right, back and left locations with regard to the orientation of the accessory device 1 of the user. When the recognition means 7 receive the position of the third-party determined by the location means 6, this position is converted into electric signals to illuminate one or several diodes.

As an example, if the third-party is in front of the user, with regard to a defined position of the device, the diode corresponding to the "front" position is illuminated. Similarly, if the third-party is forward and to the right of the user, with regard to a defined position of the device, the diodes corresponding to the "front" and "left" positions are simultaneously illuminated.

Preferably, the location means 6 also determine the distance of the third-party with regard to the user by measuring the quality of the received third-party audio stream. This determination is performed, for example, by means of quality thresholds of the received signal (bad, medium, good) which are converted into degrees of distance (far, intermediate, close) for the location of the third-party.

Preferably, the diodes of the recognition means 7 have various levels of light intensity. The position of the third-party with its degree of distance, determined by the location means 6, is converted into electric signals to indicate the location (selection of diodes to be illuminated) and distance (light intensity of the illuminated diodes).

So, thanks to the combination of the location means 6 and recognition means 7, the user can determine the location of the third-party with which he/she shares the third-party audio stream At. He/she can then contact the latter and learn more about the musical tastes of the third-party.

Here, light-emitting diodes were described but others visual recognition means could also be appropriate such as a display panel for symbols or text. Sound recognition means, such a message indicating the direction and the distance of the third-party, could also be appropriate.

Preferably, the location means 6 are coupled to the communication means 4, the directional antenna 6 serving as a receiver.

Besides, to promote the identification of the third-party, the accessory device 1 can comprise visual identification means recognizable by a third-party user. For example, the accessory device 1 can comprise a protective case or a casing the colour or shape of which and/or signs affixed to it are recognizable by a third-party.

According to another aspect of the system, apparatus, and method, referring to FIG. 4, the device includes a downlink vocal audio communication channel 8, comprising an input 81 and an output 82 in the form of male or female audio connectors, arranged to allow the passage through the device of a stream AMC of audio data originating from a microphone. The microphone can be external to the device, the downlink input 81 of the communication channel 8 being adapted to receive such a microphone, or integrated into the device, the microphone being internally connected to the downlink input 81. The downlink output 82 of the downlink communication channel 8 is adapted to be connected to an audio input of the portable audio unit, rather to an audio microphone input named MIC input.

When the portable unit is in the form of a mobile phone including an audio player function, the accessory device according to the system, apparatus, and method allows, thanks to its downlink communication channel 8, to keep the telephony functions of the mobile phone. As a matter of fact, the user can listen to a phone call by means of the audio output 3 and join in the phone call as he/she speaks in the microphone, the vocal data circulating via the downlink communication channel 8 in the device.

According to a variant of the system, apparatus, and method, the downlink audio stream originating from the microphone (internal or external) is oriented towards the mixing means 5 by means of a switch, the linkage between the downlink communication channel 8 and the mixing means being represented in FIG. 4. So, the user can sing in the microphone so that his/her song, that is a stream AMC of audio data originating from a microphone, is mixed with an inherent and/or third-party audio stream, the mixed stream Am then being possibly transmitted to the third-party user.

According to another variant of the system, apparatus, and method, the device 1 is integrated into an audio broadcasting device such as earphones or an audio broadcasting headset. For instance, an audio broadcasting headset includes two side audio broadcasting earphones connected by a support headband, the device 1 being preferably integrated into one of the headset earphones. The audio input 2 of the device is in the form of an audio cable with a jack type male audio connector at its extremity.

So, from an external point of view, the audio headset according to the system, apparatus, and method appears like a classic audio headset, its aesthetic aspect being not affected by the integration of the device. Preferably, switches and other push-buttons are provided on the outside surface of the headset earphone which integrates the accessory device, which allows the user to handle them in a quick and practical manner. Similarly, the system, apparatus, and method relate to an audio broadcasting device without headband, named headphones having earphones.

Besides, in a preferred embodiment, the recognition means are provided in the audio broadcasting unit in a usage position. As an example, the recognition means are provided on the headband of the headset or on the outside surface of the headset earphones so as to be directly visible by another user.

For headphones having earphones, in a preferred embodiment of the system, apparatus, and method, the recognition means are provided on the audio cord connecting the portable unit to the earphones. Preferably, the cord comprising two threads connecting respectively the earphones to the unit, the recognition means are provided on the Y-part of the cord, that is, at the junction of both threads of the audio cord.

The system, apparatus, and method are described here for a user sharing and receiving audio streams only with one third-party; it is obvious that the system, apparatus, and method also applies to a sharing of the stream with several third-parties; likewise, the user device can receive several audio streams from a plurality of third-party devices, in a simultaneous way.

The system, apparatus, and method are presented with a user receiving and transmitting audio streams, but it is obvious that the device can also work for emitting only or receiving only.

The invention claimed is:

1. An accessory device removably connected to a first portable audio unit, for sharing audio data between the first portable audio unit and a second portable audio unit, the accessory device comprising:
   an audio input arranged to receive an inherent audio stream from the first portable audio unit;
   an audio output arranged to connect to audio broadcasting means;
   a communication means connected to the audio input and arranged for:
      sending the inherent audio stream originating from the first portable audio unit to an accessory device connected to the second portable audio unit, and
      receiving a third-party audio stream from said accessory device of the second portable audio unit; and
   a mixing means for receiving the inherent audio stream and the third-party audio stream to produce a mixed audio stream, and sending the mixed audio stream corresponding to a combination of both the inherent audio stream and the third-party audio stream simultaneously to the audio output.

2. The accessory device according to claim 1, wherein the mixing means are further arranged to transmit the mixed audio stream to the communication means.

3. The accessory according to claim 1, wherein the accessory device further comprises visual identification means recognizable by a user of the second portable audio unit.

4. The accessory device according to claim 1, wherein the mixing means comprises:
   two attenuators arranged to receive both the inherent audio stream and the third-party audio stream as input arranged to attenuate sound volume of the inherent audio stream and the third-party audio stream to allow regulation of the sound volume of the inherent audio stream and the third-party audio stream; and
   an adder arranged to add the attenuated audio streams as output of the attenuators to form the mixed audio stream.

5. The accessory device according to claim 4, wherein, each attenuator is set up by an attenuation rate defining the attenuation of the sound volume of the audio stream received as input of said attenuator, and the mixing means include a distribution actuator arranged to control the value of the attenuation rates of the attenuators.

6. The accessory device according to claim 5, wherein, when the attenuation rate of a first attenuator is determined, the attenuation rate of the second attenuator is automatically calculated so that the sound volume of the mixed audio stream presents, as output of the mixing means, a predetermined value independent from the attenuation rate of the first attenuator.

7. The accessory device according to claim 1, wherein the communication means are wireless communication means and comprise a radio transmitter and a radio receiver-arranged to send and receive without preliminary identification between a transmitter and a receiver.

8. The accessory device according to claim 1, wherein the device further comprises means for locating the second unit transmitting the third-party audio stream.

9. The accessory device according to claim 8, wherein the location means comprise a directional antenna, a reception lobe of which is arranged to move around the position of the device.

10. The accessory device according to claim 8, wherein the accessory device further comprises recognition means, connected to said location means, and arranged to indicate to a user the relative position of the third-party with regard to the position of the accessory device.

11. The accessory device according to claim 1, further comprising a downlink audio canal with a downlink audio input capable of receiving an audio stream from a microphone and a downlink audio output capable of connecting to an audio input of the first portable audio unit.

12. The accessory device according to the claim 11, wherein the microphone is connected to the downlink audio input.

13. The accessory device according to claim 11, wherein the mixing means are further arranged to mix the audio stream of the microphone with the inherent audio stream, the third-party audio stream, or both the inherent audio stream and the third-party audio stream.

14. An audio broadcasting unit comprising an accessory device according to claim 1.

15. The audio broadcasting unit according to claim 14, wherein a recognition means are provided on a visible part of the audio broadcasting unit in a usage position.

16. A remote accessory device for a portable audio unit, the accessory device comprising:
- an audio input removably connected to the portable audio unit and receiving an inherent audio stream from the portable audio unit;
- an audio output connected to a speaker;
- a communication module connected to the audio input, the communication module transmitting the inherent audio stream received from the portable audio unit to another portable audio unit, and receiving a third-party audio stream from the another portable audio unit; and
- a mixer receiving the inherent audio stream and the third-party audio stream to produce a mixed audio stream, and outputting the mixed audio stream to the audio output, the mixed audio stream comprising a combination of both the inherent audio stream and the third-party audio stream simultaneously.

17. The remote accessory device of claim 16, wherein the mixer comprises a first attenuator attenuating a sound volume of the inherent audio stream at a first attenuation rate, a second attenuator attenuating a sound volume of the third party audio stream at a second attenuation rate, an equalizer modulating the sound volume of the inherent audio stream, and modulating the sound volume of the third-party audio stream, such that both the sound volumes of the inherent audio stream and the third-party audio streams is equal to a global volume, an adder combining attenuated sound volumes of the inherent audio stream and the third-party audio stream, and a distribution actuator simultaneously controlling the first attenuator and the second attenuator to modify the first attenuation rate and the second attenuation rate.

18. The remote accessory device of claim 17, wherein the distribution actuator is adjustable by a user to modify the value of the attenuation rate of the second attenuator for the third-party audio stream from 0% to 100%, and the attenuation rate of the first attenuator is attenuated correspondingly such that the mixed audio stream is equal to the global volume.

19. The remote accessory device of claim 16, wherein the communication module comprise a radio transmitter and a radio receiver, arranged to send and receive without preliminary identification between another radio transmitter and another radio receiver of another portable unit.

20. The remote accessory device of claim 16, further comprising a downlink vocal audio communication channel with a downlink audio input receiving an audio stream from a microphone to the mixer.

* * * * *